A. T. BROCH.
GAS HEATER.
APPLICATION FILED JAN. 21, 1922.
1,438,092.
Patented Dec. 5, 1922.
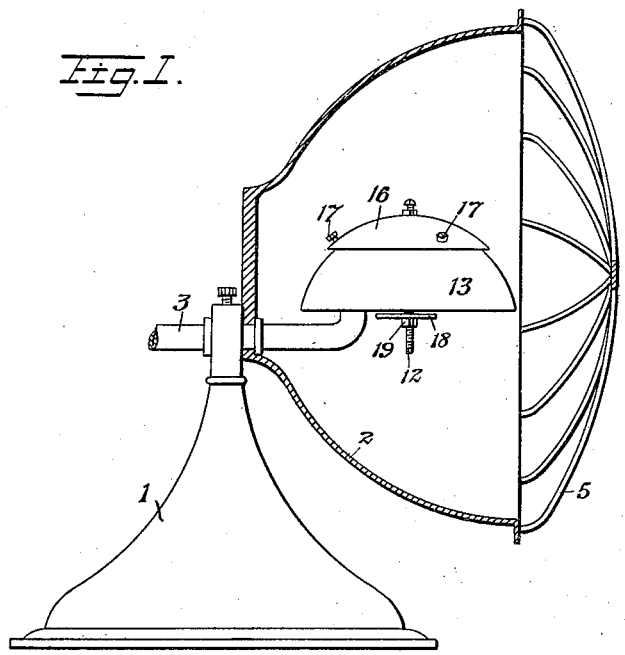
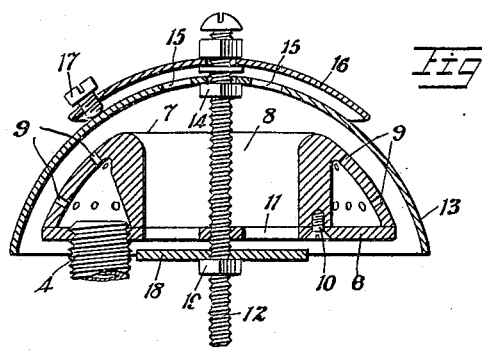
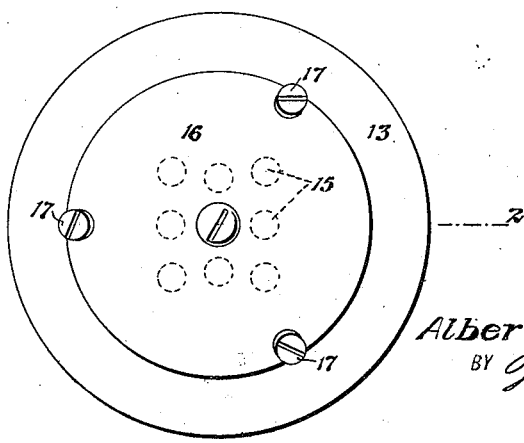
WITNESSES
H. T. Walker
F. J. Foster
INVENTOR
Albert T. Broch
BY
ATTORNEYS Patented Dec. 5, 1922.

1,438,092

UNITED STATES PATENT OFFICE.

ALBERT THEO. BROCH, OF NEW YORK, N. Y.

GAS HEATER.

Application filed January 21, 1922. Serial No. 530,365.

*To all whom it may concern:*

Be it known that I, ALBERT T. BROCH, a subject of the King of Norway, and a resident of the city of New York, borough of Manhattan, in the county and State of New York, have invented a new and useful Improvement in Gas Heaters, of which the following is a full, clear, and exact description.

This invention relates to improvements in gas heaters, an object of the invention being to provide a gas heater operating on substantially the same principle as certain electric heaters now on the market to radiate heat.

A further object is to provide a heater which will consume a comparatively small amount of gas and at the same time, will give forth an intense heat.

Still another object is to provide a heater constructed in such a manner that air is first heated by being directly exposed to the flame and then super-heated by passage over a surface which has been previously heated by the flame.

Other objects are to provide a device of this character, which will be simple and practical in construction, durable and efficient in use, capable of regulation and adjustment to control the current of heated air, and comparatively inexpensive to manufacture.

With these and other objects in view, the invention consists in certain novel features of construction and combinations and arrangements of parts as will be more fully hereinafter described and pointed out in the claims.

In the accompanying drawing:

Figure 1 is a view in side elevation of my improved heater, the reflector being show in section;

Figure 2 is a vertical section through the heater; and

Figure 3 is a top plan view thereof.

Referring in detail to the drawing, I have used the reference numeral 1 to designate a base, whereon a substantially cup shaped heat reflector 2 is mounted. A gas supply pipe 3 is carried by the base 1 and terminates in an upwardly presented screw threaded end 4 located within the reflector 2. A wire guard 5 of the usual construction may be employed at the open front of the reflector.

The threaded terminal 4 of the gas supply pipe 3 screws into the base plate 6 of a circular burner 7. The burner 7 is in the form of an annular gas receiving housing having a central opening 8, the walls of which, are substantially vertical. The outer walls of the burner 7 are curved and provided with any suitable number of burner orifices 9. The base plate 6 is removably attached to the burner, as indicated at 10, and is formed with a central spider 11, wherein a screw 12 is mounted for vertical adjustment.

A substantially bell-shaped or semi-spherical mantle 13 is curved concentrically with the outer walls of the burner 7. A nut 14 on the screw 12 serves to support this mantle in proper position to cover and conceal the burner 7, the inner wall of the mantle being spaced an equal distance from the outer wall of the burner at all points. The screw 12 extends upwardly through the mantle, as seen most clearly in Figure 2.

Arranged around this nut are a plurality of vent holes 15 in the mantle top adapted to permit the escape of heated air from under the mantle. A hood 16 curved in conformity with the mantle 13 is also mounted for vertical adjustment on the screw 12 and serves to conceal the vent holes in the top of the mantle. A plurality of set screws 17 or any other suitable spacing devices are utilized to maintain the hood in spaced relationship to the mantle, so that the hood is equally spaced from the mantle throughout its entire periphery and a free circulation of air is had between the hood and mantle.

A draft regulator in the form of a disk 18 is screwed onto the lower end of the screw 12 and a nut 19 is used for adjusting the disk to either close the central opening in the burner, or to permit a draft of air therethrough, it being understood that a draft is at all times had around the outside of the burner between the burner and mantle.

The theory of operation is as follows: When the burner is in operation, the mantle being exposed directly to the flame will become red hot. A draft of air passing upwardly around the burner and through the same will be heated by the direct heat of the flame and the radiated heat of the mantle. The heated air passing upwardly will escape through the vent holes 15 and following over the outer surface of the mantle will escape under the edges of the hood 16. In this manner the air will not only be heated directly by the flame, but will be super-heated by being directed over the outer heated surface of the mantle under the hood 16.

Although I have illustrated one of the preferred embodiments of my invention, it will be apparent that various slight changes and alterations might be made in the general form and arrangement of the parts described without departing from the invention, and hence I do not wish to limit myself to the precise details set forth, but shall consider myself at liberty to make such slight changes and alterations as fairly fall within the spirit and scope of the appended claims.

I claim:

1. In a gas heater, a burner, a mantle over the burner having vent holes therein, and means for directing the heated air passing through the vent holes over the outer heated surface of the mantle, said means comprising a hood adjustably concealing the vent holes and spaced from the mantle.

2. In a gas heater, a burner, a mantle over the burner having vent holes therein, and means for directing the heated air passing through the vent holes over the outer heated surface of the mantle, said means comprising a hood adjustably concealing the vent holes and spaced from the mantle, and said mantle and hood being concentrically curved.

3. In a gas heater, a burner, a mantle over the burner having vent holes therein, and means for directing the heated air passing through the vent holes over the outer heated surface of the mantle, said means comprising a hood adjustably concealing the vent holes and spaced from the mantle, and means for regulating the draft of air through the vent holes.

4. In a gas heater, a burner comprising an annular housing having curved outer walls and a central opening therein, said outer walls being provided with burner orifices, a mantle covering and spaced from said burner, said mantle being curved in conformity with the outer walls of the burner, and having vent holes adjacent its top.

5. In a gas heater, a burner comprising an annular housing having curved outer walls and a central opening therein, said outer walls being provided with burner orifices, a mantle covering and spaced from said burner, said mantle being curved in conformity with the outer walls of the burner, and having vent holes adjacent its top, a hood spaced from the mantle concealing said holes and directing heated air escaping from said holes over the outer surface of the mantle.

6. In a gas heater, a burner comprising an annular housing having curved outer walls and a central opening therein, said outer walls being provided with burner orifices, a mantle covering and spaced from said burner, said mantle being curved in conformity with the outer walls of the burner, and having vent holes adjacent its top, a hood spaced from the mantle concealing said holes and directing heated air escaping from said holes over the outer surfaces of the mantle, and a central rod whereon said burner mantle and hood are mounted for vertical adjustment.

7. In a gas heater, a burner comprising an annular housing having curved outer walls and a central opening therein, said outer walls being provided with burner orifices, a mantle covering and spaced from said burner, said mantle being curved in conformity with the outer walls of the burner, and having vent holes adjacent its top, a hood spaced from the mantle concealing said holes and directing heated air escaping from said holes over the outer surfaces of the mantle, and a central rod whereon said burner mantle and hood are mounted for vertical adjustment, and a disk adjustable on said rod to regulate the draft through the center of the burner.

ALBERT THEO. BROCH.